Oct. 23, 1962  F. W. R. STARP  3,059,559
PHOTOGRAPHIC CAMERA
Filed March 23, 1960  2 Sheets-Sheet 1

INVENTOR.
Franz Wilhelm R. Starp
BY
March, Gillette, Virgil & Eslinger
ATTORNEYS

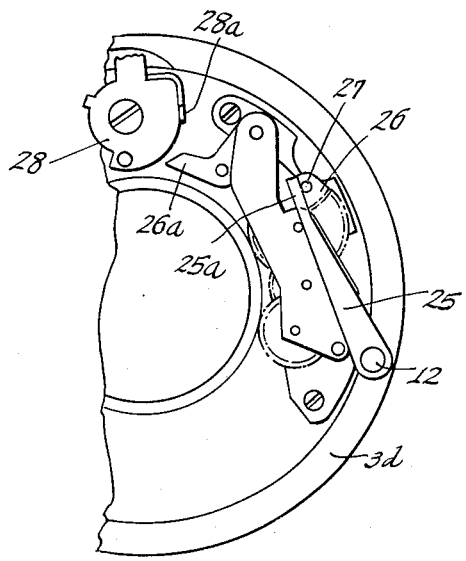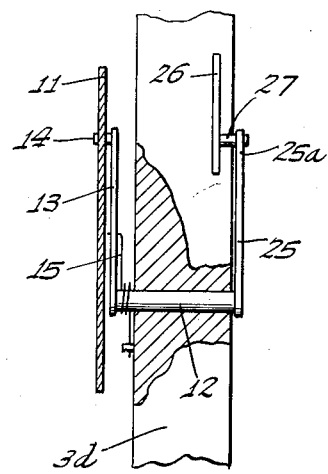

United States Patent Office 3,059,559
Patented Oct. 23, 1962

3,059,559
PHOTOGRAPHIC CAMERA
Franz Wilhelm R. Starp, Calmbach (Enz), Germany, assignor to Alfred Gauthier G.m.b.H., Calmbach (Enz), Germany, a corporation of Germany
Filed Mar. 23, 1960, Ser. No. 17,208
Claims priority, application Germany Mar. 25, 1959
3 Claims. (Cl. 95—64)

This invention relates to photographic cameras of the type having diaphragm-aperture and shutter-speed adjusting means which are adjusted by a single setting member in such a way as to provide uniform exposure value gradations.

An object of the present invention is to provide a novel and improved camera of the general type outlined above, wherein an especially easy or small-force responsive adjustability of the diaphragm and shutter speed by means of the single setting member is at all times insured, together with a reliable and accurate cooperation between the diaphragm and shutter speed setting mechanisms, this being accomplished by relatively few structural members which may be economically fabricated and assembled, said members requiring a minimum amount of space and the construction having optimal simplicity and easy mobility with respect to the manner in which it operates and functions.

This is accomplished, in accordance with the invention, essentially by the provision of setting devices characterized by individual, pivotally movable levers arranged to be actuated by cam means which are connected to the single setting member.

Compared with prior known cameras wherein discs or rings are arranged as the setting devices for the diaphragm and shutter speed, a camera constructed in accordance with the invention as outlined above has the important advantage of an easier adjustability requiring less operating force since the moment of rotation or torque needed for adjusting or shifting a lever is considerably less than that required for adjusting or shifting discs or rings. These latter call for greater adjusting forces because of the greater frictional resistance occurring at the supporting surfaces of such members, as compared with the pivotal supports for levers. The small adjusting force required in a camera constructed in accordance with the invention does not only have a favorable effect when the operator utilizes the manual setting of the camera, but in addition is of considerable importance in those cameras wherein, for the purpose of effecting an automatic exposure setting, the single setting member is adjusted in response to operation of a well known light intensity measuring device.

An especially space-saving construction of the adjusting device in accordance with the invention, which construction involves only a small number of structural members and is very advantageous from the production standpoint because of the simplicity and short transmission paths extending between the diaphragm and speed setting devices and the single setting member, is obtained by locating the pivotal levers in spaced parallel planes of motion and by arranging the connections between that lever which is spaced the greatest distance from the single setting member so as to include an additional lever which is affixed to one end of a shaft carrying at its other end the said lever which is spaced from the single adjusting member. The said additional lever is then made cooperable with the cam means associated with the single setting member.

A further particularly advantageous construction as provided by the invention, as regards simplicity of the structures of the speed and diaphragm adjusting devices and a reliable positioning of the said shaft carrying the two levers, is obtained, in cameras of the type having intra-lens shutter assemblages, by locating the said shaft in a side wall of the shutter housing.

An embodiment of the invention is described and illustrated herein, said embodiment constituting a photographic camera having an intra-lens shutter assemblage. Reference is had to the following specification and the accompanying drawings, in which:

FIG. 4 is a fragmentary elevational view of interior portions of the shutter shown in FIG. 1, as seen with the cover plate removed. This figure shows the arrangement and cooperation of a pivotal adjusting lever and the shutter speed escapement mechanism.

FIG. 5 is a diagrammatic view partly in vertical section through the side wall of the shutter housing and partly in side elevation, showing the connection of the control lever with a cam ring.

Figure 1:
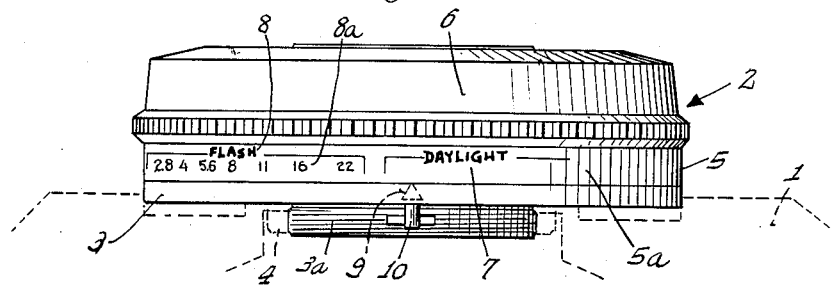
FIG. 1 is a diagrammatic top plan view of an intra-lens shutter assemblage arranged for mounting on the front of a photographic camera, the said shutter assemblage having speed and diaphragm setting devices constructed in accordance with the invention.

Referring first to FIG. 1, the front portion or wall of the photographic camera is designated by the numeral 1. Attached to the front wall 1 in a well-known manner is a photographic intra-lens shutter assemblage 2, such attachment being effected by a nozzle 3a provided on the rear of the shutter housing 3, said nozzle having an external thread on which there is screwed a holding ring or nut 4. The ring 4 thus secures the nozzle 3a and the shutter assemblage 2 to the front of the camera case.

An exposure value setting ring 5, which constitutes the single setting member of the shutter assemblage, is mounted on the front side of the shutter housing 3 and is secured in place, in the well-known manner, by means of a front plate 6.

For the purpose of effecting exposure settings, the setting ring 5 cooperates in a well-known manner with an exposure meter which is mounted on the camera case, and which comprises a photo-electric cell (not shown) and a measuring mechanism or movement. The connection between the exposure value setting ring 5 and the exposure meter may be effected in any suitable manner, as for example that disclosed in copending U.S. patent application Ser. No. 839,819, filed September 14, 1959 and entitled Photographic Camera. Since the present invention does not relate to such connection, the coupling and transmission members associated therewith are not shown in the present drawings.

In order to arrange the exposure value setting member 5 so as to provide for uniform exposure value gradations, arranged in the direction of adjustment of the member, two closed setting ranges are sequentially arranged on the cylindrical surface 5a of the setting member, each having a uniform exposure value gradation. The range 7 indicated thereon is adapted for daylight exposures, and the range 8 is for use in connection with flash exposures. The range 8 additionally comprises a diaphragm scale 8a provided for the purpose of setting the diaphragm aperture, on the case of flash exposures, in accordance with the type of flash bulb utilized, or in accordance with the guide number and the distance. The setting for daylight exposures and flash exposures, as well as setting of the diaphragm aperture for exposures in the flash range, is made in connection with an index mark 9 which is fixedly provided on the camera.

The cocking of the shutter is done, in a well known manner, by means of a shaft 10 which projects from the rear of the shutter housing and which is connected to an actuating device (not shown) as for example the film transport device of the camera.

Figure 2:
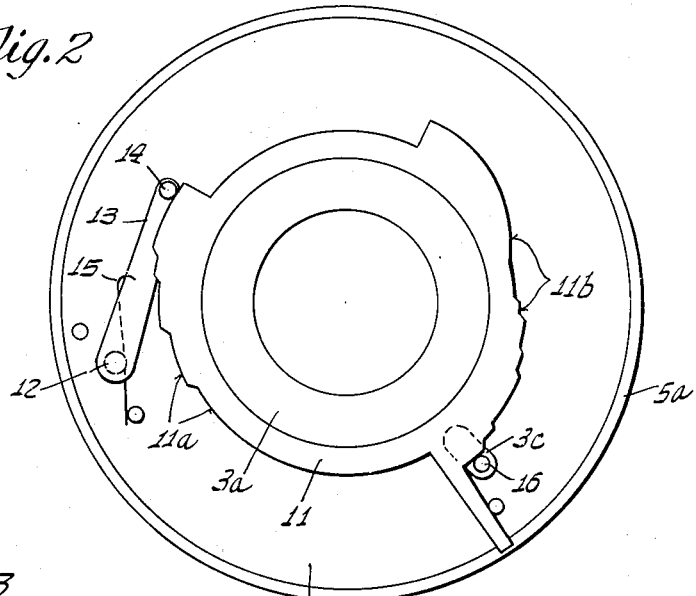
FIG. 2 is a rear elevational view of the members of the setting device, which are arranged at the rear of the shutter shown in FIG. 1.

As is apparent from FIG. 2, a control ring 11 is provided, said ring being rotatably drivingly connected to the single setting member or ring 5 and being positioned on the tubular connection or nozzle 3a. The control ring 11 is provided for the purpose of connecting the exposure value setting ring 5 with the shutter speed and diaphragm aperture adjusting devices. Cams 11a and 11b are provided on the peripheral surface of the control ring 11, said cams cooperating with the setting or adjusting devices for the diaphragm and/or the exposure time (shutter speed).

In order, in accordance with the invention, to obtain settings using the smallest possible adjusting forces in a camera of the above described kind, the setting devices utilize pivotally mounted levers which are actuated by means of the cam ring 11 which is connected to the single setting member or ring 5. This results in the important advantages outlined earlier in the text.

Figure 3:
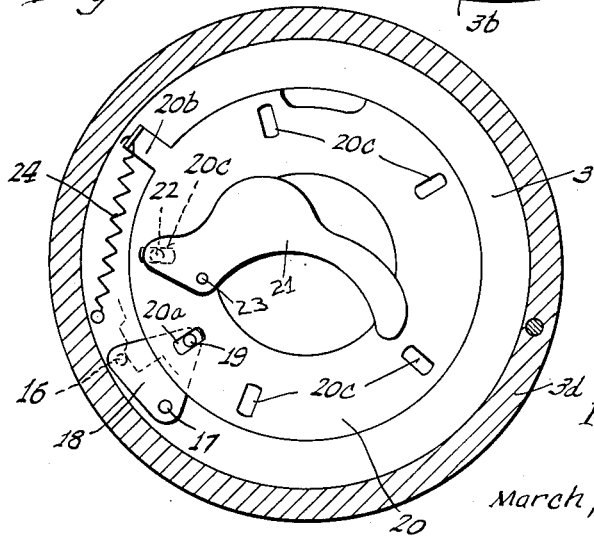
FIG. 3 is a vertical sectional view through the intra-lens shutter assemblage, illustrating an iris type diaphragm as provided in the rear portion of the shutter housing, this figure also showing those members of the setting device which co-operate with the said iris diaphragm.

FIGS. 2 and 3 show the said levers, cooperating with the setting or adjusting devices. As is apparent from FIG. 2, there is provided a shaft 12 which is rotatably mounted on the bottom 3b of the shutter housing, the said shaft having affixed to one end a one-armed lever 13. The lever 13 carries at its free end a sensing or cam follower pin 14, which is made to engage the cam edge 11a of the cam ring 11 under the action of a spring 15 acting on the lever. As will be explained in detail later, the lever 13 cooperates with the setting or adjusting device for the shutter speed.

As will be seen in FIG. 2, another sensing or cam follower pin 16 is provided for engagement with the second cam 11b provided on the cam ring 11, the cam 11b being associated with the diaphragm adjusting mechanism of the shutter assemblage. The pin 16 passes through a clearance slot 3c provided in the bottom 3b of the shutter housing, said slot extending in a radial direction as shown. The follower pin 16 is affixed to one end of a segment-shaped lever 18 which is pivotally mounted about a pivot pin 17 provided on the inside of the bottom of the shutter housing (FIG. 3.) The free end of the segment lever 18 carries a driving pin 19 which is received in a slot 20a provided in the diaphragm actuating ring 20.

In FIG. 3 the numeral 21 refers to a diaphragm segment or sector which is provided in the shutter housing. Only one segment or lamella is shown for reasons of clarity of illustration. The diaphragm lamellas or segments are connected to the actuating ring 20 by means of pins 22 affixed to the sectors, said pins being received in radial slots 20c provided in the actuating ring. The diaphragm segments are pivotally movable about fixed pivot pins 23.

In order to insure a reliable engagement of the pin 16 with the cam 11b of the cam ring 11, an arm 20b is provided on the diaphragm actuating ring 20, said arm being connected to a helical extension spring 24 which biases the diaphragm actuating ring 20 in a counter clockwise direction as viewed in FIG. 3. Thus, through the connection between the diaphragm actuating ring and the lever 18, the pin 16 carried by the said lever is caused to remain continually in enagement with the cam 11b of the cam ring 11.

It is apparent from the figures that the planes of movement of the levers 13 and 18 are parallel to each other and spaced apart, such arrangement being especially provided by the invention. This results in an axially compact structure of the shutter assemblage.

In order to transmit the pivotal movement of the lever 13 to the exposure time setting mechanism, there is provided by the invention a one-armed adjusting lever 35 which is associated with the exposure time or shutter speed control mechanism, the said lever being affixed to the other end of the shaft 12 which carries the lever 13 and thereby being rotatably drivingly connected to the lever 13 (FIGS. 4 and 5). As is apparent from the figures, the free end 25a of the lever 25 is located in the path of movement of a stop pin 27 which is affixed to a tooothed segment 26 of an exposure time escapement mechanism constructed in a well known manner. Depending on the position of the driver arm 25a the pin 27 of the segment 26 will travel in a path of greater or lesser distance after the shutter has been released, and in so doing it will keep the shutter open for a correspondingly longer or shorter time.

The escapement mechanism controls, in a manner known per se, a well known tensioning and driving disc 28 (shown in FIG. 4), which upon running down in a clockwise direction effects engagement between an arm 28a thereof and an arm 26a of the toothed segment 26, thereby to pivotally drive the segment. The latter imposes a delay on the movement of the driving disc 28 due to the associated members of the escapement mechanism. That is, the arm 26 provides a counterclockwise but yielding opposing force on the driving disc 28, and after an extent of movement of the segment 26 and arm 26a thereof the latter will be shifted outside of the path of movement of the arm 28a, effecting a release of the shutter driving disc 28 whereby the said disc completes its exposure-effecting travel without further delay.

An especially space-saving construction of intra-lens shutter assemblage as provided by the invention is had, as may be seen in FIGS. 3, 4 and 5, when the shaft 12 which connects the levers 13 and 15 is disposed in the side wall 3d of the shutter housing 3. This arrangement has the advantage that the interior of the shutter is available exclusively for the mechanism arranged therein, such as, for example, the delayed action mechanism, the escapement mechanism and the like, and no additional space is required for housing the transmission control members of the setting devices.

Irrespective of the different embodiments by which the present invention may be illustrated, and irrespective of the type of camera and intra-lens shutter in which the invention may be incorporated, the advantages set forth above which result from the use of the invention will be had at all times, as regards the small adjusting forces which are required when actuating the single exposure value setting member.

I claim:

1. A photographic camera having diaphragm aperture and shutter speed adjusting means and having a single exposure value setting member adapted to provide uniform exposure value gradations; a pair of transmission devices operable by small forces and having little friction, connected respectively between said adjusting means on the one hand and said single setting member on the other hand, each of said devices comprising a pivotally mounted lever and an associated cam, said cams being operatively connected with said single setting member and being engageable with the levers respectively for actuating said levers whereby the adjusting means are regulated with the expenditure of small force when the setting member is shifted, one of said levers being connected directly with one of said adjusting means.

2. The invention as defined in claim 1, in which the levers are disposed in spaced parallel planes one of which is disposed further from the single setting member than the other, and in which there is a shaft and an additional lever, said additional lever and the lever disposed in the said one plane being affixed respectively to the ends of said shaft and said additional lever being directly connected with one of said adjusting means.

3. The invention as defined in claim 2, in which the camera is of the type having an intra-lens shutter assemblage including a shutter housing, and in which the said shaft is disposed in a side wall of the shutter housing.

References Cited in the file of this patent

UNITED STATES PATENTS

| | | |
|---|---|---|
| 2,418,370 | Simmon | Apr. 1, 1947 |
| 2,949,069 | Gebele | Aug. 16, 1960 |